United States Patent
Dinger et al.

[11] Patent Number: 5,260,018
[45] Date of Patent: Nov. 9, 1993

[54] CONGLOMERATE METALLIC MATERIAL

[75] Inventors: Rudolf Dinger, St-Aubin; Robert Soder, Montreux; Albert Willemin, Le Landeron, all of Switzerland

[73] Assignee: Eta SA Fabriques d'Ebauches, Granges, Switzerland

[21] Appl. No.: 770,455

[22] Filed: Oct. 3, 1991

[30] Foreign Application Priority Data

Oct. 10, 1990 [CH] Switzerland ............ 03256/90

[51] Int. Cl.$^5$ ............................................. B22F 1/00
[52] U.S. Cl. .................................. 419/38; 419/40; 419/39; 419/31; 428/551; 428/568
[58] Field of Search .............. 419/38, 39, 40, 31, 419/35, 45, 57; 428/546, 551, 564, 565, 568

[56] References Cited

U.S. PATENT DOCUMENTS

| 4,194,040 | 3/1980 | Breton et al. | 428/308 |
| 4,595,558 | 6/1986 | Baldwin et al. | 419/66 |
| 5,059,387 | 10/1991 | Brasel | 419/38 |

FOREIGN PATENT DOCUMENTS 538721 8/1973 Switzerland .

OTHER PUBLICATIONS

Patent Abstract entitled: Rotary Weight for Self-Winding Wrist Watch vol. 9 No. 152 Jun. 27, 1985.
Patent Abstract entitled: Production of Superhard Alloy Case vol. 5 No. 47 Mar. 28, 1981.

Primary Examiner—Donald P. Walsh
Assistant Examiner—Anthony R. Chi
Attorney, Agent, or Firm—Griffin Butler Whisenhunt & Kurtossy

[57] ABSTRACT

The finished metallic material of this invention is constituted by an agglomerate of finely divided metallic powder, the grains of which are bonded together by means of an organic substance, the volume of such substance being comprised between 0.5 and 7% of the total volume of the material. In order to obtain said material, the metallic powder is mixed with the organic substance, the mixture is moulded under high pressure and after removal from the mould, the material is heated in order to harden the organic substance. The material is employed to advantage for elements constituting horological articles.

31 Claims, 2 Drawing Sheets

CONGLOMERATE METALLIC MATERIAL

This invention concerns a finished met constituted by an agglomerate of finely divided metallic powder.

BACKGROUND OF THE INVENTION

In the traditional transformation of metals into finished products through the use of cavity moulds, for instance by casting, forging, stamping or sintering, the dimensional precision often is insufficient. The practice thereof requires expensive installations and high professional qualifications, which renders manufacture in large series attainable only with difficulty.

In powder metallurgy, the finely divided metal is moulded under high pressure and then subjected to thermal sintering. By sintering, here one understands an operation carried out in powder metallurgy so as to bring about an agglomeration of the treated products in order to give them sufficient cohesion and rigidity. When one heats to a high temperature grains of metallic powder contacting one another by compression, there is brought about a true welding of the grains before their melting temperature has been attained, and one obtains a rigid and compact metallic mass. However, at the time of removal from the mould and prior to sintering, the parts are very sensitive to manipulation in view of their lack of cohesion. Additionally, sintering is accompanied by a relatively substantial shrinkage which requires corrections to the mould. Small parts and those exhibiting complex forms then pose multiple manufacturing problems and such procedure has definite limits.

In the horological industry, it has often been proposed to form watch cases by the sintering technique. An example of a case thus obtained is described in the patent document CH-A-538 721 where the shrinkage problem is mentioned.

The patent document US-A-4 194 040 claims a semi-finished material composed of metallic powder into which is mixed 85 to 99% of polytetrafluorethyline resin fibrils. This material as such exhibits no mechanical strength and it will thus be necessary to sinter it at high temperature in order to bestow thereon a good strength. During the sintering, the resin forming the bond among powder grains disappears by pyrolysis and the finished material is 100% metallic.

The patent document US-A-4 595 558 also claims a semi-finished material in the form of briquettes composed of a mixture of manganese and aluminium powder. To this mixture is added a 0.5 portion in volume of polyglycol. Such briquettes are then soaked in molten aluminium, this having as result a finished product exhibiting a manganese aluminium alloy, the polyglycol having totally disappeared.

Furthermore, there are known thermoplastic materials having a metallic powder filler and moulded by injection. Such thermoplastic materials require a melting viscosity adapted to completely fill the mould. The proportion of metal may hardly exceed about 40% in volume. This has as a consequence that the characteristic properties of the metals are diminished and the characteristic properties of the thermoplastics become dominant.

There is also known transfer moulding of a mixture of thermosetting material with finely divided metal powder. But here the flow of the molten material is of short distance. It is however possible to mould mixtures having a higher molten viscosity which enables the proposal of a higher proportion of metal, but still hardly exceeding 50% by volume. It will also be noted that the hardening of the mixture by polyaddition or polycondensation must take place in the mould itself which prolongs considerably the manufacturing cycles and leads to low productivity. Here also, the characteristic properties of the thermosetting materials are those which predominate to the detriment of the characteristic properties of the metals.

SUMMARY OF THE INVENTION

In order to overcome the cited difficulties, this invention is characterized in that the material composed of finely divided metallic powder, exhibits metallic grains which are bonded together by means of an organic substance the volume of said substance being comprised between 0.5 and 7% of the total volume of the material.

The present invention also concerns the use of the material in elements of small dimensioned mechanisms as well as a method of manufacture of such material in which one produces a mixture containing a finely divided metallic powder and at least one organic substance the volume content of which is comprised between 0.5 and 7% of the material in the finished state, introduces said mixture into a mould to which high pressure is applied and removes from the mould the material thus obtained which is maintained during a predetermined time at a temperature sufficient to harden said organic substance.

The invention will now be understood with the help of the description to follow and the drawings which illustrate it by way of example.

DESCRIPTION OF THE PREFERRED EMBODIMENTS

Material

Figure 1:
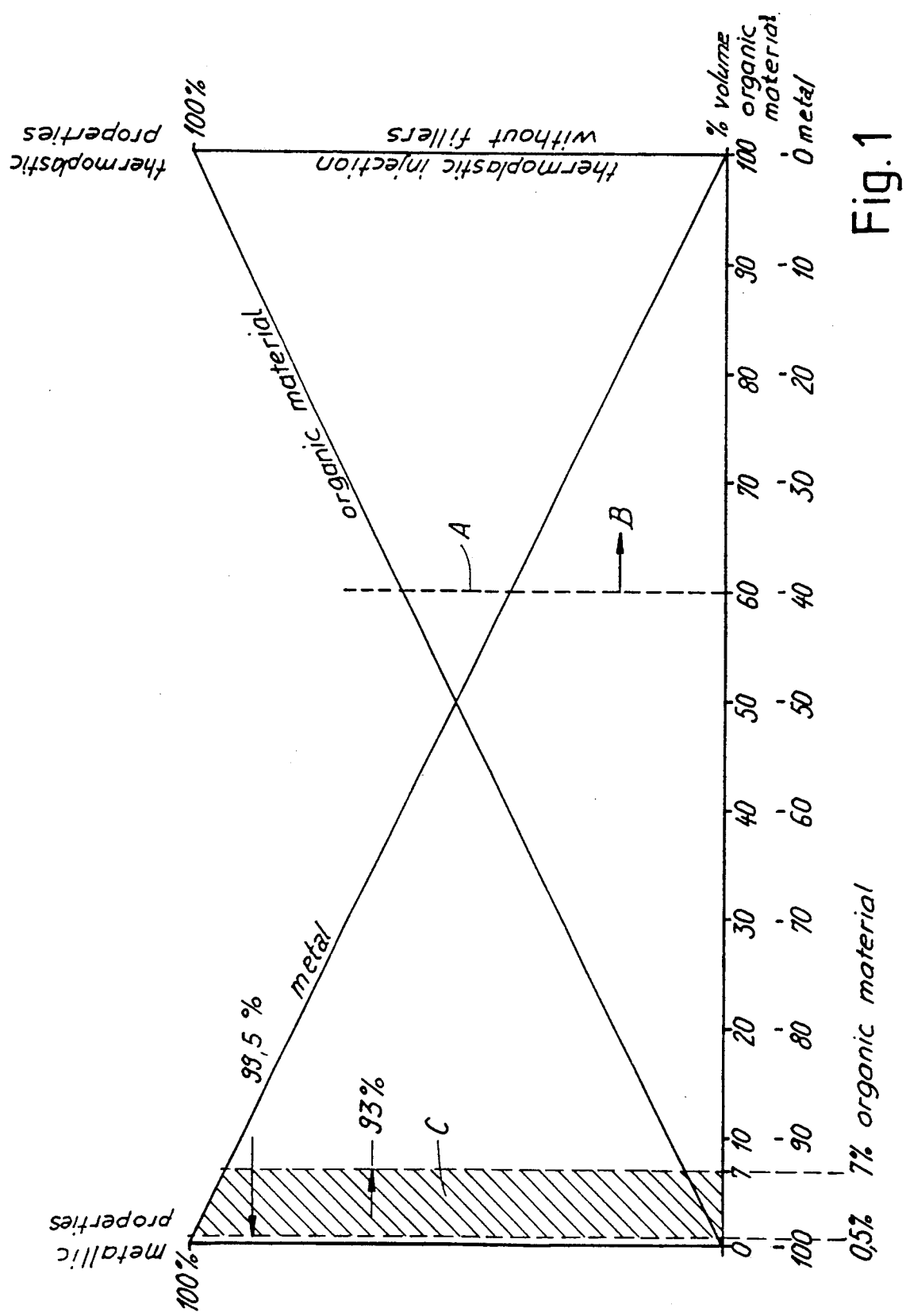
FIG. 1 is a diagram showing the characteristics of a material composed of metal and of thermoplastic matter and in which the percentage of the components thereof relative to one another is caused to vary.

FIG. 1 is a diagram showing the characteristics of a material composed of metal and thermoplastic matter, this latter serving as bond between the grains constituting the metallic material. There has been shown on the axis of the abscissa in the direction of increase the percentage in volume occupied respectively by the metallic material (from 100% to 0%) and by the thermoplastic material (from 0% to 100%). in the ordinate there has been drawn a scale from 0 to 100% taking into account the respective properties of the metallic material and the thermoplastic material. At the left of the diagram and at the place for which the volume of metal is 100%, it will be understood that one is concerned with a purely metallic material while at the right of such diagram and at the place for which the volume of the thermoplastic material is 100%, one is concerned with a pure injection of plastic material with no metallic filler. Between such two extreme states have been drawn two lines which intersect and which indicate for a given abscissa whether the metallic properties or the thermoplastic properties are those which dominate in the composite material under consideration. Thus, as has been mentioned hereinabove, a composite material composed of more than 60% of thermoplastic material (limit of thermoplastic injectability, reference A of the diagram of FIG. 1). exhibits progressively as such percentage increases and as the metal contents conjointly diminishes (arrow B), the dominant characteristics of such plastic material, the characteristics associated with the diminishing more and more.

The domain covered by this invention is located to the left of the diagram of FIG. 1 and is represented by the hatched zone C. In this zone the grains composing the finely divided metallic powder are bonded together by means of an organic substance, the volume of such substance being comprised between 0.5 and 7% of the total volume, of the material Consequently, the metallic powder occupies respectively a volume comprised between 99.5 and 93% of the total volume of the material. Here one is concerned thus with a predominantly metallic material with all the properties which result therefrom as, for instance, good conductivity, easy machinability, good abrasion resistance, etc.

By organic substance bonding together the metallic grains one covers here, as will appear in the examples which are given hereafter, thermoplastic materials, (for instance a polysulfone) and thermosetting materials (for instance a polimide resin) or further a mixture of both types of matter. However. the invention is not limited to these types of material. monomers which are polymerized in place being likewise employable.

The cohesion of the metallic grains is consideraby improved and accordingly the mechanical strength of the entire material by covering the grains with a fine film of oxide, sulphide or selenide. Such film may be found naturally at the surface of the grains or can be artificially brought about, for instance by means of an air current which oxidizes the grains. It will be understood that the film in question improves the adhesion of the organic substance to the metallic grains in question.

According to the invention and as is placed in evidence on FIG. 1, the volume of the organic substance bonding the grains together is comprised between 0.5 and 7% in volume of the total volume of the finished material. Such two limits result from very numerous trials effected on a large number of samples. From such trials there results clearly that if the percentage of bonding material is less than 0.5%, the cohesion among the grains is insufficient to assure the mechanical strength of the material. The latter may break or crumble and withstands poorly machining (turning, boring) which one could be brought to carry out on a blank coming out of the mould. In the same manner, there results from such trials that a percentage of binder greater than 7% obtained by the method recommended further on has no advantage. Effectively, in view of the high pressure applied to the material, the binder would be expelled from the interstices separating the grains, the material then showing an undesirable sweating which would tend to glue the parts together during the subsequent hardening of the binder, such hardening being brought about in bulk with application of heat. In the same manner, a percentage exceeding 7% would offer a material which would show properties clearly less interesting (mechanical strength, electrical conductivity) than those obtained with the material of the invention.

One of the very important purposes which the invention pursues is the obtaining of a material not exhibiting any shrinkage or a minimum shrinkage at its removal from the mould, this in contrast to the sintering suggested in the introduction to this description. One thus directly obtains inexpensive precise parts without the necessity of envisaging subsequent retouching. In sum, one may obtain parts exhibiting the same precision as that obtained in injecting synthetic materials while conserving the properties and characteristics of metals.

Method

This purpose is attained by practising the method of the invention which includes in all the cases envisaged the following essential steps:

There is produced a mixture containing a finely divided metallic powder and at least one organic substance the volume content of which is comprised between 0.5 and 7% of the material in the finished state. By finely divided, here there is understood a metallic powder, the size grading of which is generally less than 60 $\mu$m with spherical or any other form of grains. All metals may be envisaged. In the examples subsequently given, there have been used for example bronze, tin, brass, aluminium, copper, chrome steel, nickel or even iron. It has already been mentioned that the organic substance may be a thermoplastlc or thermosetting material, a mixture of the two or again a monomer.

Once the mixture has been formed, this is introduced into a mould which generally includes two portions and in which the dimensions of the cavity correspond exactly to the dimensions of the finished parts. A high pressure is applied to the mould during a predetermined time. The pressure is on the order of 8 to 15 tons per square centimeter (t/cm$^2$) and is applied during a time varying from 5 to 10 seconds, this permitting a rapid production cadence which is suitable to mass production manufacture.

The parts thus obtained at high cadence are removed from the mould and are introduced in bulk into an oven the temperature of which is just sufficient to harden the organic substance serving as binder among the metallic grains. After a certain time, the parts are removed from the oven and allowed to cool. The parts are then ready to undergo, if necessary, the usual machining such as is practised on ordinary metals.

The method which has just been set out gives the broad outline of the general procedure to follow in order to obtain the material of the invention. This method is however subject to multiple variations in detail depending on the metal and the organic substance employed. The manner of forming the mixture, the addition of special agents enabling a better adherence of the organic substance onto the metallic grains, etc.

There will now be given some non-exhaustive examples of precise methods which have been tried with success.

Example 1

993 g of bronze tin (Cu/sn 93.5/6.5) in spherical grains sized to <60 $\mu$m are mixed with 7 g of polysulfone (polycondensation between bisphenol-A and 4.4'-dichlorodiphenylsulfone) in powder form To this mixture there is added methylene chloride + toluene (40/60% volume). Following dissolving of the polysulfone, the solvent is evaporated by kneading. By screening at about 200 $\mu$m there is obtained a moulding powder which is placed in a mould and pressed with 12 t/cm². The parts removed from the mould are then hardened in bulk at 340° C. during 10 minutes.

In this example, the organic substance takes the form of a powder which is a thermoplastic material (polysulfone). Once the first mixture has been obtained, there is added thereto a solvent (methylene chloride + toluene) in order to dissolve the organic substance and thus to form a sludge the solvent of which is evaporated while kneading it to the point of obtaining a second mixture which is introduced into the mould. It will be understood that the solvent enables a regular distribution of the organic substance around the grains which are thus surrounded by a thin layer of binding material once the solvent has evaporated. The final material includes 95.4% metal and 4.5% of organic substance (by volume).

Example 2

992 g of granular brass, sized to <50 μm, are heated to 260° C. during ½ hour in a ventilated oven. Following cooling, the surface oxidized brass is mixed with 8 g of PPS, polyphenylenesulfide (polycondensation between p-dichlorobenzene and sodium sulphide) in the form of a very fine powder sized to about 5 μm. To this mixture, there is added the same dispersant solvent mentioned in example 1, which is completed with 0.2% polyslfone. The evaporation of the solvent and moulding under high pressure take place under the same conditions as in example 1. Thermohardening in bulk must be carried out at 380° C. during two hours.

In order to increase the hardness of small parts, the thermo treatment is prolonged in the presence of air in the ventilated oven. The degree of hardness depends on the time of cross-linking which is from 45 minutes to two hours at a temperature of 380° C.

This example differs from example 1 in particular in that the metallic grains are exposed to air prior to their mixing with the organic substance. Following such exposure, they are thus coated with a fine oxide film. The organic substance here is a thermosetting material (polyphenylenesulfide). The final material includes 95.1% metal and 4.9% of organic substance (in volume). It will be observed that a supplementary hardening is effected by chemical cross-linking in the presence of oxygen.

Example 3

992 g of granular aluminium sized to <60 μm, are mixed with a dilute solution composed of a mixture of 5 g of bisphenol-A-glycidylether resin completed by a hardener having an aromatic amine base (for instance m-phenylenediamine) and 3 g of polyvinylbutyral resin. Following evaporation of the solvent and sizing of the residue to about 200 μm, the powder to be moulded is heated to 75° C. and pressed under 10 t/cm² in a mould. The hardening of the moulded parts takes place in bulk at 170° C. during 4 hours.

In this example, the solution of the organic substance (a thermo-settable: bisphenol-A-glycidylethe resin) is mixed with a thermoplastic material (polyvinylbutyral resin) in order to serve as lubricant during mixture and to facilitate filling of the mould. The final material includes 98.2% metal and 1.7% of organic substance by volume.

Figure 2:
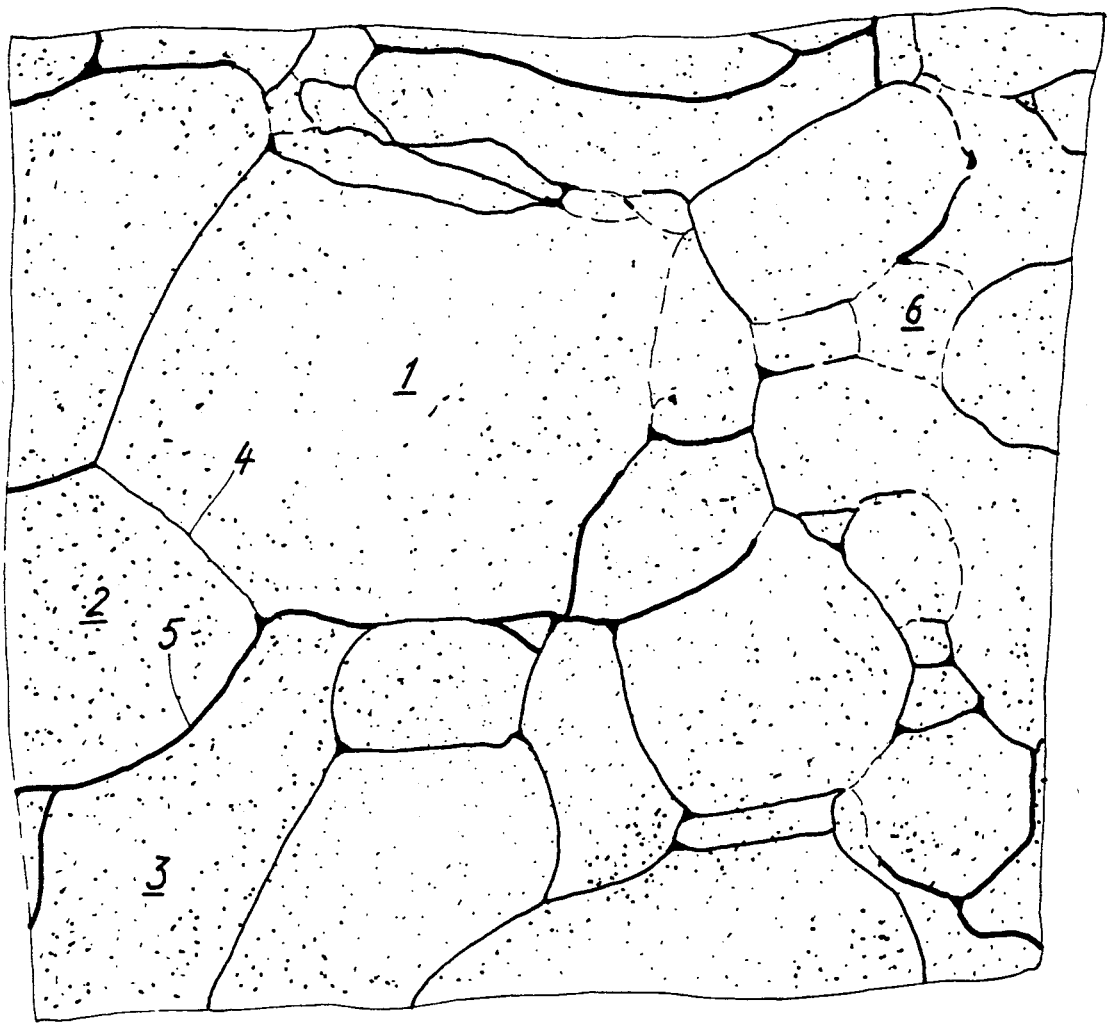
FIG. 2 is a cross-section through the material of the invention after enlargement of about 1600 times.

FIG. 2 is a cross-section through a material obtained according to this example and according to a photograph enlarged 1600 times. It is seen that the grains are separated by interstices of variable thickness filled in with the organic substance. During the moulding, the pressure is variably distributed among the grains, driving the organic substance more or less in the direction of least pressure. Between grain 1 and grain 2 for instance, the frontier 4 is not particularly visible while it is much more marked at 5 which is the interstice separating grain 2 from grain 3. In certain places the grains contact one another, for example grain 6 is in direct contact with its neighbouring qrains.

Example 4

993 g of powdered copper of <50 μm granular measure are given a surface treatment with a chemical adhesion promoter of gamma-glycidoxypropyl-trimethoxysilane (for example "A-187" of UNION CARBIDE) in a solution of 0.5% in acetone. Following one hour stirring at 50° C., there is added the binder which enters likewise into solution, namely 3.5 g of epoxyde cycloaliphatic resin (for instance "ERL-4221" of UNION CARBIDE) and 3.5 g of cis-hexahydrophthalic acid anhydride. Following evaporation of the acetone, there is obtained by sizing a moulding powder of around 200 μm which is formed under high pressure. The hardening of the moulded parts takes place in bulk at 180° C. during two hours.

In this example, the finely divided metal powder is mixed with a chemical adhesion promoter in solution in a solvent in order to obtain a first mixture. Such adhesion promoter creates chemical bonds between metal and organic substance or between the oxide film covering over the metal, if such exists, and the organic substance. The purpose of such promoter is to strongly increase the mechanical strength of the moulded parts. There is added to the first mixture an organic substance (here a thermosettable taking the form of epoxide and anhydride resin) in order to obtain a second mixture which is dried and kneaded to the point of obtaining a third mixture, in effect the powder to be moulded. The final material includes 94.8% metal and 5.2% organic substance by volume.

Figure 3:
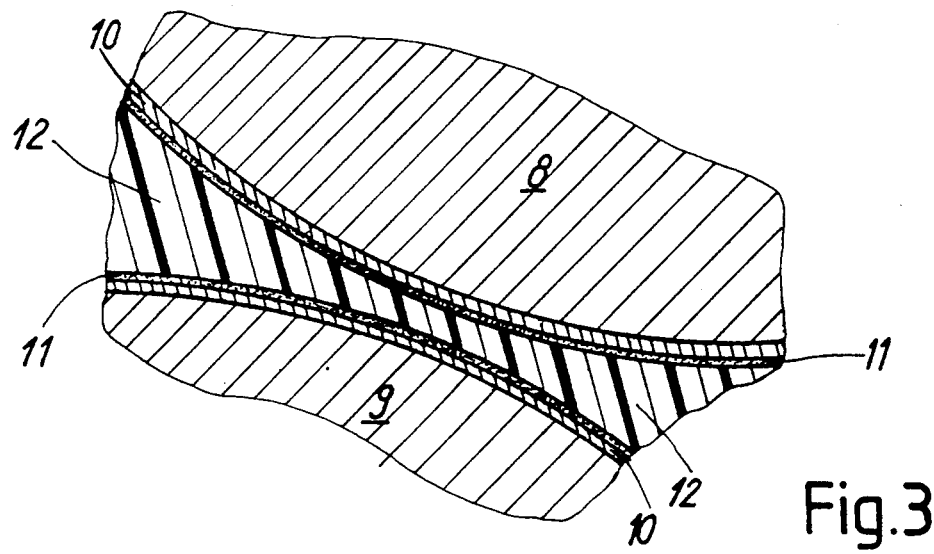
FIG. 3 shows a schematic cross-section in the material of the invention, such cross-section being highly magnified, in which two metallic grains, partially shown, are agglomerated together by means of an organic substance.

FIG. 3 shows a schematic cross-section taken in the material of the invention to illustrate the cohesion between two grains 8 and 9 agglomerated according to this example. Although the above specifications do not mention it, the copper grains 8 and 9 are enveloped by a fine oxide film (between 1 and 10 nm) obtained naturally and referenced 10. The oxide film is surrounded in turn by a film of adhesion promoter 11. Finally, the grains thus coated are bonded together by means of the organic substance 12. It will be understood that the solvent used does not appear on FIG. 3, this representing the finished material.

Example 5

One proceeds as in example 4, but with a proportion of 990 g of copper for 10 g of binder (5 g +5 g). At the start there is added to the copper powder 20 g of wollastonite (beta-calcium silicate, in acicular microcrystals, for instance "CASIFLUX A-38" — registered trademark — of J. de POORTER B.V., Geertruidenberg/NL).

Wollastonite is a fibrous reinforcing filler which improves the mechanical strength of the material. It will be noted that in place of an acicular monocrystal, one may have fine fibres of glass, quartz, carbon or graphite, the carbon and graphite improving at the some time the electrical conductivity of the parts. The final material includes 93.5% metal and 6.5% of organic substance.

Example 6

990 g of finely divided chrome-nickel 18/8 steel, granular measurement <60 μm, are mixed with a solution of 10 g of polyimide resin (for instance "KERIMIDE 1050" - registered trademark of RHONE-POULENC) and 0.7 g of silane "A187" (UNION CARBIDE), in N-methylpyrrolidone/xylene, 70/30 mixture by volume. The solvent is eliminated by stirring at 130° C. and the residue is sized to about 200 μm. To this moulding powder there is added an electrical conductivity promoter, for instance carbon black, of fibrillar structure "CORAX L" — registered trademark of DEGUSSA. This mixture is stirred in a drum mixer for about two hours. Following moulding under pressure of 50 t/cm², the pieces upon removal from the mould are hardened in bulk at 250° C. during 20 minutes, thereafter they are baked at 230° C. during 8 hours.

In this example, the organic substance (thermosettable, polyimide resin) is mixed with a chemical adhesion promoter (silane) and a solvent (NMP/xylene). Next, the organic substance associated with the metallic powder only is mixed in order to obtain a first mixture appearing in the form of a sludge, the solvent of which is evaporated by kneading with application of heat in order to obtain a second mixture. To such second mixture there is added, and here appears the originality of the material according to this example, an electrical conductivity promoter, here carbon black, in order to form a third mixture which one may mould. In place of the carbon black, one could employ metallic powders of silver, copper, aluminum, zinc or their alloys. Generally, the electrical conductivity promoter improves the conductivity of the material and facilitates thus the galvanic metallization of the finished products. The final material includes 94.6% metal and 5.4% organic substance.

Example 7

990 g of iron powder sized to <45 μm are mixed with an acetonic solution containing:
10 g bisphenol-A-glycydylether-polymer + cis-hexahydrophthalic acid anhydride + dicyandiamide
20 g talc (magnesium hydrosilicate)
5 g hydrargillite (aluminium hydroxide)

Following elimination of the solvent and drying under vacuum, the moulding powder is sized to about 200 μm, formed under a pressure of 12 t/cm² and, after removal from the mould, the parts are hardened at 160° C. during 4 hours.

The novelty to be indicated here is the addition of a filler of lamellar structure (talc, hydrargillite) to the organic substance (bisphenol polymer + anhydride) and to the solvent (acetone) which serves as lubricant during moulding and facilitates filling of the mould. This filler pursues effectively the same purpose as the thermoplastic material employed in example 3.

Example 8

992 g of tin bronze (Cu/Sn 93.5/6.5) in spherical grains having diameters <60 μm, are mixed with a solution of 0.3% gamma-aminopropyltriethoxysilane (adhesion promoter "A-1100" of UNION CARBIDE) in propyleneglycol (1.2-propandiol, of boiling point 189° C.). Following one hour of stirring at 70° C., there is added the binder, namely 8 g of polyamide 6.6, of the extrusion type of high molecular weight. While continuing to stir, the temperature of the mixture is increased to 160° C., enabling the total dissolving of the polyamide. Next, slow cooling takes place, without stopping the stirring in order to obtain the maximum of spherolitic crystallinity of the polyamide 6.6 at the surface of the bronze grains. The moulding powder is collected by filtration, washing with water and drying. The parts are moulded at 10 t/cm² and, following removal from the mould, hardened at 260° C. during 10 minutes.

In this example, there is prepared a solution of chemical adhesion promoter (A-1100) mixed with a solvent (propyleneglycol). The tin bronze powder is mixed with this solution in order to form a first mixture. Following stirring with application of heat, there is added to the first mixture an organic substance (thermoplastic of the polyamide 6.6 type) in order to obtain a second mixture which one continues to stir while increasing the temperature until dissolving of the organic substance. Finally, the third mixture is recovered by filtration, washing with water and drying, such third mixture then being the effective moulding powder.

Utilization

It has already been indicated that the material of the invention enables obtaining precise parts at low cost and high production cadence, such pieces being adapted to be machined afterwards with means usually employed for solid metals.

It has also been indicated that in order to obtain the material in question, there must be exerted a high pressure (up to 15 t/cm²) on the mould containing the composite moulding powder.

Such material will thus be successfully employed for small parts having to be produced in large series. One thinks in particular of parts employed in small dimension mechanisms and among the latter, particularly parts forming the movement of a timepiece (baseplate, bridge, pinion) as well the externals of such a timepiece case, bezel, bracelet element.

What I claim is:

1. A finished metallic material constituted by an agglomerate of finely divided metallic powder, the grains composing the powder being bonded together by an organic substance, the volume of said substance comprising between 0.5 and 7% of the total volume of the material.

2. A material as set forth in claim 1 wherein the grains are coated with a film constituted by an oxide, a sulphide or a selenide.

3. Utilization of the material as set forth in claim 1 or in claim 2 for elements of small-dimension mechanisms.

4. Utilization f the material as set forth in claim 3 wherein said elements are components of a timepiece movement.

5. Utilization of the material as set forth in claim 3 wherein said elements are components of a case for a timepiece.

6. A method of manufacturing a finished metallic material of finely divided metallic powder bound together with about 0.5 to 7% by volume of at least one organic bonding agent, comprising:
 (1) mixing finely divided metallic powder with about 0.5 to 7% by volume of at least one organic bonding agent to product a moulding mixture thereof;
 (2) introducing the moulding mixture into a mould;
 (3) subjecting the mould to a high moulding pressure sufficient to mould the moulding mixture to a shape-sustaining moulded form;

(4) removing the moulded form from the mould; and
(5) subjecting the moulded form to sufficient temperature for a sufficient time to harden the moulded form.

7. The method of claim 6 wherein the organic bonding agent is in powdered form, a sufficient amount of solvent for the bonding agent is added to the moulding mixture to produce a sludge-like consistency thereof, the sludge-like consistency moulding mixture is kneaded and the solvent is substantially evaporated therefrom, and the moulding pressure is sufficient to agglomerate the metallic powder and bond the metallic powder together.

8. The method of claim 6 wherein a solvent is added to the bonding agent to provide a solution thereof, a thermoplastic moulding lubricant is added to the solution in an amount sufficient to ensure the filling of the mould with the moulding mixture, the metallic powder is added to the solution to form a sludge-like consistency of the moulding mixture, the sludge-like consistency moulding mixture is kneaded and the solvent is substantially evaporated therefrom, the moulding mixture is heated to a temperature sufficient to soften the bonding agent and the moulding pressure is sufficient to agglomerate the metallic powder and bond the metallic powder together.

9. The method of claim 6 wherein an adhesion promoter is mixed with a solvent to produce a solution thereof and the solution is mixed with the metallic powder to form a pre-mixture thereof, the bonding agent is mixed with the pre-mixture to form the moulding mixture having a sludge-like consistency, the sludge-like consistency moulding mixture is kneaded and the solvent substantially evaporated therefrom, and the moulding pressure is sufficient to agglomerate the metallic powder and bond the metallic powder together.

10. The method of claim 6 wherein an adhesion promoter and a sufficient amount of a solvent is added to the bonding agent so as to produce the moulding mixture with a sludge-like consistency, the moulding mixture is kneaded and heated so as to substantially evaporate the solvent therefrom, an electrical conductivity promoter is added thereto and stirred sufficiently to disperse the electrical conductivity promoter, and the moulding pressure is sufficient to agglomerate the metallic powder and bond the metallic powder together.

11. The method of claim 6 wherein a filler having a lamellar structure and solvent are added to the bonding agent so as to produce the moulding mixture in a sludge-like consistency, the solvent is substantially evaporated therefrom and the moulding mixture is dried under vacuum, and the moulding pressure is sufficient to agglomerate the metallic powder and bond the metallic powder together.

12. The method of claim 6 wherein an adhesion promoter is mixed with a solvent to produce a solution thereof and the solution is mixed with the metallic powder to form a pre-mixture thereof, the pre-mixture is heated and stirred while adding the bonding agent thereto such that the bonding agent is dissolved therein to produce the moulding mixture, the moulding mixture is cooled, filtered, rinsed with water and dried, and the moulding pressure is sufficient to agglomerate the metallic powder and bond the metallic powder together.

13. The method of claim 6 wherein the bonding agent is selected from the group consisting of a thermoplastic polymer, a thermosetting polymer, a thermosetting monomer or pre-polymer and mixtures thereof.

14. The method of claim 6 wherein the bonding agent is a thermoplastic polymer.

15. The method of claim 6 wherein the bonding agent is a thermosetting polymer, a thermosetting monomer or pre-polymer thereof.

16. The method of claim 13 wherein the bonding agent is selected from the group consisting of a polysulfone, polyimide, polyphenylenesulfide, polyvinylbutyral resin, epoxide cycloaliphatic resin and polyamide.

17. The method of claim 6 wherein the metallic powder has a size grading of less than about 60 $\mu$m.

18. The method of claim 17 wherein the metallic powder is selected from the group consisting of bronze, tin, brass, aluminum, copper, chrome steel, nickel, iron and mixtures thereof.

19. The method of claim 6 wherein the metallic powders have a thin film of an oxide, sulphide or selenede thereof.

20. The method of claim 27 wherein the thin film is an oxide and the thin film is produced in situ by oxidation of the metallic powder.

21. The method of claim 6 wherein the molding pressure is between about 8 and 15 tons per square centimeter and the moulding time is between about 5 and 10 seconds.

22. The method of claim 6 wherein the bonding agent is a thermosetting polymer, thermosetting monomer or pre-polymer thereof and the moulded form is subjected to sufficient temperature to cause cross-linking thereof.

23. The method of claim 8 wherein the moulding lubricant is a thermoplastic polymer.

24. The method of claim 23 wherein the thermoplastic polymer is polyvinylbutyral.

25. The method of claim 6 wherein a fibrous reinforcing filler is added to the metallic powder.

26. The method of claim 25 wherein the reinforcing filler is selected from the group consisting of wollastonite, glass fibers, quartz, carbon and graphite.

27. The method of claim 10 wherein the adhesion promoter is a silane.

28. The method of claim 12 wherein the adhesion promoter is a silane.

29. The method of claim 10 wherein the electrical conductivity promoter is selected from the group consisting of powders of carbon black, silver, copper, aluminum, zinc and mixtures thereof.

30. The method of claim 6 wherein the metallic powder constitutes about 93% to 99.5% of the moulded form.

31. The method of claim 11 wherein the filler is selected from the group consisting of talc and hygrargillite.

* * * * *